Patented May 10, 1949

2,469,682

UNITED STATES PATENT OFFICE 2,469,682

MONOAZO DYE COMPOUNDS CONTAINING A BUTADIENE-1,3 GROUPING

Joseph B. Dickey, Rochester, N. Y., assignor to Eastman Kodak Company, Rochester, N. Y., a corporation of New Jersey No Drawing. Application November 28, 1947, Serial No. 788,680

5 Claims. (Cl. 260—205)

This invention relates to new monoazo dye compounds and the process of applying them to the dyeing or coloring art. The new compounds are particularly valuable for the coloring of textile materials made of or containing a cellulose alkyl carboxylic acid ester, in which ester the acid radicals contain from two to four, inclusive, carbon atoms. They also possess some utility for the coloration of textile materials made of cotton, wool, silk or nylon.

The cellulose alkyl carboxylic acid esters which may be dyed or colored include the hydrolyzed as well as the unhydrolyzed cellulose alkyl carboxylic acid esters such as cellulose acetate, cellulose propionate, or cellulose butyrate and the hydrolyzed as well as the unhydrolyzed mixed cellulose alkyl carboxylic acid esters such as cellulose acetate-propionate and cellulose acetate-butyrate.

It is an object of my invention to provide new azo dye compounds. Another object of my invention is to provide colored textile materials which are of good fastness to light, washing, and gas fading. A further object is to provide a process for the direct coloration of cellulose alkyl carboxylic acid ester, wool, silk, or nylon textile materials. A particular object of my invention is to provide new nuclear non-sulfonated azo compounds suitable for the coloration of cellulose acetate. A still further object is to provide a satisfactory process for the preparation of the new azo compounds of the invention.

The azo compounds by means of which the above objects are accomplished or made possible can be represented by the formula:

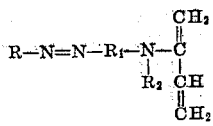

wherein R and R₁ each represent a residue of a monocyclic benzene nucleus and R₂ represents a hydrogen atom, an alkyl group having from one to four, inclusive, carbon atoms, a hydroxyalkyl group having from two to three, inclusive, carbon atoms, and an alkoxy-alkyl group having from three to four, inclusive, carbon atoms.

The azo compounds having the above general formula can be prepared by coupling a diazotized monocyclic aminobenzene compound with a derivative of butadiene-1,3 having the formula:

wherein R₁ and R₂ have the meanings previously assigned to them.

A remarkable feature of the compounds of my invention is that after they have been applied to the fabric they can be polymerized by suitable treatment to yield an extremely wash-resistant polymeric dye having the formula:

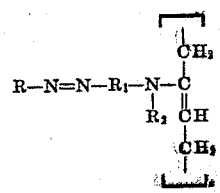

wherein R, R₁, and R₂ have the meaning previously assigned and $x$ stands for a whole number.

As will be apparent from the examples given hereinafter the member R₁ can have substituents such as a methyl group, a methoxy group, an acetamino group, a halogen atom, and a hydroxy group. Similarly, the member R can have substituents such as a nitro group, a halogen atom, a methyl group, an ethyl group, a methoxy group, an ethoxy group, a hydroxy group, an aceto group, a methyl sulfone group, an ethylsulfone group, a sulfoamide group, a carboxy group, and a sulfo group.

Both sulfonated and non-sulfonated compounds are included within the scope of my invention. The nuclear non-sulfonated compounds have been found to be especially of value for the dyeing of cellulose alkyl carboxylic acid esters, particularly cellulose acetate, and it is to these compounds and their application for the dyeing of cellulose alkyl carboxylic acid esters that my invention is especially directed. The nuclear non-sulfonated compounds likewise possess some application for the dyeing of wool, silk, or nylon. The nuclear sulfonated compounds of my invention have little or no utility for the dyeing of cellulose alkyl carboxylic acid esters but possess application for the dyeing of wool, silk, or nylon. Preferably when the dye compounds of the invention are to be employed for the coloration of cellulose alkyl carboxylic acid esters, they should contain no nuclear free carboxylic acid group. Orange, red, rubine, yellow, and violet colors, for example, can be obtained using the dye compounds of the invention.

The new azo compounds of my invention can be used in connection with photography. For this purpose they may be used directly in their non-polymerized form or applied and then polymerized in a suitable manner. For example, they may be used to prevent the agglomeration of particles of silver halide, as non-diffusing dyes in a photographic film and the like.

The following examples illustrate the azo compounds of my invention and the manner in which they are prepared.

*Example 1*

13.8 grams of p-nitroaniline are dissolved in 200 cc. of water containing 25 cc. of 36% hydrochloric acid. The resulting solution is cooled to a temperature of 0–5° C. and diazotized by the addition, with stirring, of 6.9 grams of sodium nitrite dissolved in 20 cc. of water.

14.5 grams of 2-anilinobutadiene-1,3 are dissolved in 200 cc. of a cold dilute solution of acetic acid. The resulting solution is cooled to about 0–10° C. and the diazo solution prepared above is added. Coupling is accomplished by adding a solution of sodium acetate with stirring until the reaction mixture is neutral to Congo red paper. The precipitate is recovered by filtration, washed with water, and dried. The resulting azo dye compound has the formula:

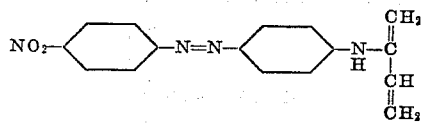

It colors cellulose acetate orange shades from an aqueous suspension of the dye which may contain an anti-oxidant such as hydroquinone. After washing, the dyed cloth is exposed for a short time to a source of ultraviolet light or immersed in a water bath containing a peroxide such as hydrogen peroxide, benzoyl peroxide, acetyl peroxide, peracetic acid, tertiary-butyl hydro peroxide, and the like. After about 5–25 minutes, the fabric is removed, washed, and dried. By a procedure such as the above the dye is polymerized on the fabric and made fast to washing.

*Example 2*

20.8 grams of 4-nitro-2,6-dichloroaniline are added to 200 cc. of water containing 30 cc. of 36% hydrochloric acid. The resulting solution is cooled to a temperature approximating 0–5° C. by the addition of ice and diazotized in the usual manner by the addition, with stirring, of 6.9 grams of sodium nitrite dissolved in water.

18.9 grams of 2-N-$\beta$-hydroxyethyl-2-anilino butadiene-1,3 are dissolved in 200 cc. of dilute hydrochloric acid. Coupling is accomplished by adding the diazo solution prepared above, cooling the resulting mixture to 0–10° C., and then adding a solution of sodium carbonate slowly with stirring until the reaction mixture is neutral to litmus. The precipitate is recovered by filtration, washed with water, and dried. The resulting azo dye compound has the formula:

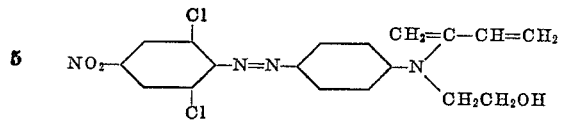

and colors cellulose acetate brownish-red shades. The dye may be polymerized on the fabric by any suitable procedure including the procedure described in Example 1.

*Example 3*

A. 26.1 grams of 2-amino-3,5-dinitrophenyl methyl sulfone are dissolved in 225 cc. of hot glacial acetic acid and the mixture is then cooled rapidly to room temperature while stirring.

B. 7.6 grams of sodium nitrite are added to 50 cc. of cold sulfuric acid, the resulting mixture is heated to 70° C. and then cooled to 15° C.

The mixture prepared in B is stirred while the mixture prepared in A is added thereto over a period of 30–45 minutes while maintaining a temperature of 15–20° C. Stirring is continued after the addition of the last of the amine mixture prepared in A and then 1 gram of urea is added.

18.9 grams of N-$\beta$-hydroxyethyl-2-anilino-butadiene-1,3 are dissolved in a dilute hydrochloric acid solution and the resulting solution is cooled to a temperature approximating 0–10° C. The diazo solution prepared as described above is then added with stirring while maintaining the reaction mixture in a cooled condition. The coupling reaction which takes place is completed by adding sodium acetate until the reaction mixture is neutral to Congo red paper following which the dye compound formed is recovered by filtration, washed with water, and dried. The dye compound obtained colors cellulose acetate violet shades and may be polymerized on the fabric in the manner hereinafter described. The dye has the formula:

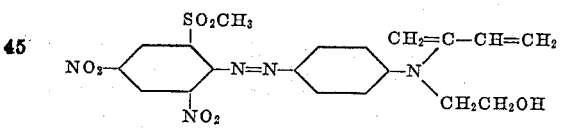

*Example 4*

21.5 grams of 2-amino-5-nitrophenyl methyl sulfone are diazotized in known fashion.

18.9 grams of N-$\beta$-hydroxyethyl-2-anilinobutadiene-1,3 are dissolved in 200 cc. of cold, dilute hydrochloric acid. The diazo solution prepared above is then added whereupon the reaction mixture is cooled to 0–10° C. and sodium carbonate solution is slowly added, with stirring, until a neutral reaction is obtained on testing with litmus. The precipitate is collected by suction filtration, washed with water, and dried. The resulting azo dye compound colors cellulose acetate rubine shades and may be polymerized on the fabric in the manner hereinafter described. The dye has the formula:

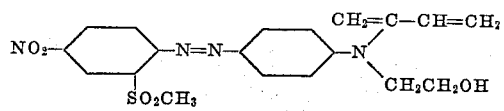

*Example 5*

21.5 grams of 2-amino-5-nitrophenyl methyl sulfone are diazotized in known fashion.

20.3 grams of 2-N-$\beta$-hydroxyethyl-m-toluidinobutadiene-1,3 are dissolved in 200 cc. of cold, dilute hydrochloric acid. The diazo solution prepared above is then added whereupon the reaction mixture is cooled to 0–10° C. and sodium carbonate solution is slowly added with stirring until a neutral reaction is obtained on testing with litmus. The precipitate is collected by suction filtration, washed with water, and dried. The resulting azo dye compound colors cellulose acetate rubine shades and may be polymerized on the fabric in the manner hereinafter described. The dye has the formula:

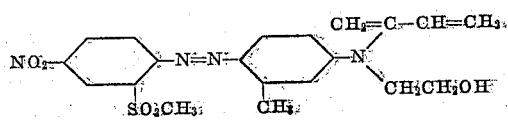

*Example 6*

21.6 grams of 2-amino-5-nitrobenzene sulfonamide are diazotized in the usual manner and the diazonium compound formed is added to 200 cc. of a cold, dilute acetic acid solution containing 18.9 grams of 2-N-methyl-m-methoxy-anilino-butadiene-1,3. The coupling reaction and recovery therefrom of the precipitated azo dye compound are accomplished according to the procedure described in Example 1. The resulting dye colors cellulose acetate rubine shades and may be polymerized on the fabric. It has the formula:

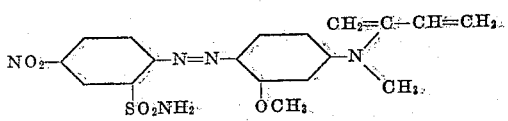

*Example 7*

15.3 grams of p-nitro-o-hydroxyaniline are diazotized in known fashion and the diazonium compound formed is added to 200 cc. of a cold, dilute hydrochloric acid solution containing 18.9 grams of 2-N-(2'-methoxy-5'-methyl) anilino-butadiene-1,3. The coupling reaction and recovery of the precipitate formed is accomplished according to the procedure of Example 2. The resulting azo dye compound colors cellulose acetate pink shades and may be polymerized on the fabric in the manner hereinafter described. The dye has the formula:

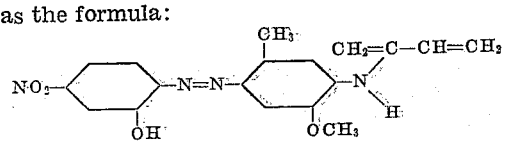

*Example 8*

18.3 grams of 2,4-dinitroaniline are diazotized according to the procedure of Example 3 and the resulting solution of diazonium compound is added to a cold solution of 21.7 grams of 2-N-β-methoxyethyl-m-toluidino-butadiene-1,3 in dilute acetic acid. Coupling is completed by adding sodium acetate solution until the reaction mixture is neutral to Congo red. The precipitate formed is recovered by filtration, washed with water, and dried. The resulting azo dye compound has the formula:

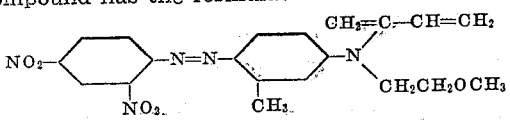

and colors cellulose acetate violet shades. Polymerization on the fabric may be accomplished, for example, according to the procedure used in Example 1.

*Example 9*

21.8 grams of 2,4-dinitro-6-chloroaniline are diazotized in known fashion and the diazonium compound formed is coupled with 30.6 grams of 2-N-β,γ-dihydroxypropyl-2-methoxy-5-acetamino-anilino-butadiene-1,3 according to the procedure of Example 1. The precipitate is recovered by filtration, washed with water, and dried. The resulting azo dye compound has the formula:

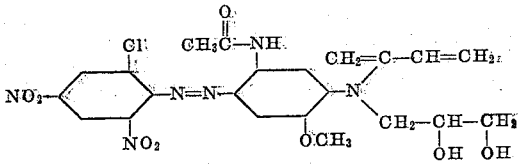

and colors cellulose acetate reddish-blue shades. Polymerization on the fabric may be accomplished as hereinafter disclosed.

*Example 10*

13.1 grams of 2-amino-5-nitroacetophenone are diazotized in the usual manner and the diazonium compound formed is added to 200 cc. of a cold, dilute hydrochloric acid solution containing 18.7 grams of 2-N-ethyl-m-toluidinobutadiene-1,3. The coupling reaction and recovery of the precipitate are performed in accordance with the procedure described in Example 2. The resulting azo dye compound colors cellulose acetate rubine shades and may be polymerized on the fabric in the manner hereinafter described. The dye has the formula:

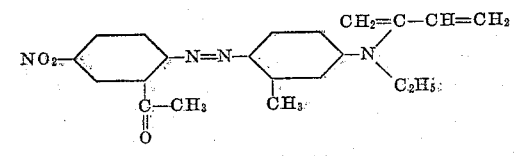

*Example 11*

15.1 grams of o-methyl-p-nitroaniline are diazotized in known fashion and the diazonium compound formed is added to 200 cc. of a cold, dilute hydrochloric acid solution containing 24.9 grams of 2-N-β,γ-dihydroxypropyl-m-anisidino-butadiene-1,3. The coupling reaction and recovery of the precipitate formed are accomplished according to the procedure of Example 2. The resulting azo dye compound colors cellulose acetate red shades and may be polymerized on the fabric in the manner hereinafter described. The dye has the formula:

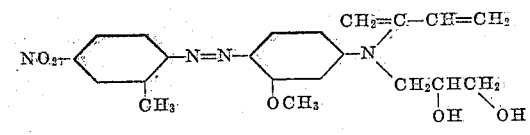

In place of o-methyl-p-nitroaniline 16.5 grams of o-ethyl-p-nitroaniline are diazotized and reacted as above to produce a similar dye which also colors cellulose acetate red shades and can be polymerized on the fabric.

*Example 12*

16.7 grams of o-methoxy-p-nitroaniline are diazotized in the usual manner and the diazonium compound formed is added to 200 cc. of a cold, dilute hydrochloric acid solution containing 23.6 grams of 2-N-n-butyl-m-chloroanilino-butadiene-1,3. The coupling reaction and recovery of the precipitate formed are accomplished according to the procedure of Example 2. The resulting azo dye compound colors cellulose acetate red shades and may be polymerized on the fabric in the manner hereinafter described. The dye has the formula:

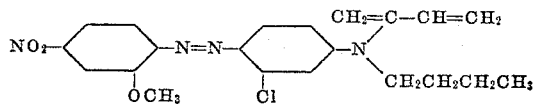

Similarly 18.1 grams of o-ethoxy-p-nitroaniline are diazotized and coupled as above described to obtain a dye compound which colors cellulose acetate red shades and can be polymerized on the fabric.

*Example 13*

20.0 grams of 2,4-dinitro-6-hydroxyaniline are diazotized in the manner described in Example 3. The solution of diazonium compound thus formed is added to 200 cc. of a cold, dilute acetic acid solution containing 20.5 grams of 2-N-β-hydroxy-ethyl-m-hydroxyanilinobutadiene-1,3. The coupling reaction and recovery of the precipitate resulting therefrom are performed in accordance with the procedure described in Example 3. The resulting azo dye compound colors cellulose acetate violet shades and may be polymerized on the fabric in the manner hereinafter described. The dye has the formula:

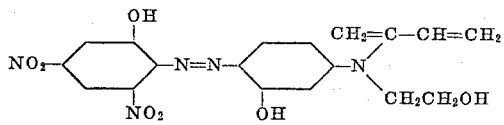

*Example 14*

13.8 grams of o-nitroaniline are diazotized in known fashion and the diazonium compound formed is added to 200 cc. of a cold, dilute hydrochloric acid solution containing 17.5 grams of m-anisidino-2-butadiene-1,3. The coupling reaction and recovery of the precipitate formed are accomplished according to the procedure of Example 2. The resulting azo dye compound colors cellulose acetate orange shades and may be polymerized on the fabric in the manner hereinafter described. The dye has the formula:

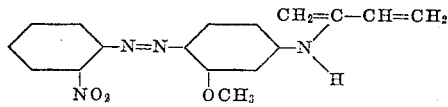

*Example 15*

16.9 grams of o-aminophenylmethyl sulfone are diazotized in the usual manner and the diazonium compound formed is added to 200 cc. of a cold, dilute acetric acid solution containing 24 grams of 2-N-γ-hydroxypropyl-o-chloroanilinobutadiene-1,3. The coupling reaction and recovery of the precipitate formed are accomplished in accordance with the procedure described in Example 1. The resulting azo dye compound colors cellulose acetate yellowish-orange shades and may be polymerized on the fabric in the manner hereinafter described. The dye has the formula:

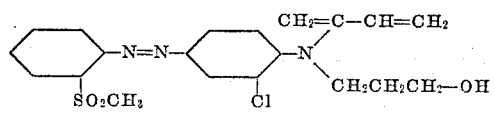

*Example 16*

18.9 grams of sodium m-hydroxy-p-aminobenzene sulfonic acid and 7.0 grams of sodium nitrite are dissolved in 120 cc. of water and cooled with ice. The solution is then poured, with stirring, into 100 cc. of water containing 17 cc. of sulfuric acid. The diazonium compound formed is added to 200 cc. of a cold, dilute hydrochloric acid solution containing 15.9 grams of m-toluidine-2-butadiene-1,3. Coupling is completed by adding an aqueous solution of sodium carbonate until the reaction mixture reacts slightly alkaline to litmus. The dye formed is salted out of solution by adding sodium chloride, recovered by filtration, washed with water, and dried. Wool, silk, and nylon are colored yellow shades from an aqueous solution of the dye which may contain salt. Polymerization of the dye on the fabric may be accomplished by any procedure hereinafter described. The dye has the formula:

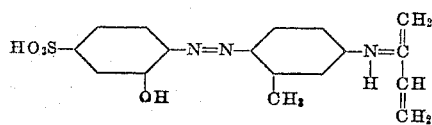

*Example 17*

21.7 grams of 2-amino-5-nitrobenzene sulfonic acid are dissolved in 150 cc. of water containing 6 grams of sodium carbonate and diazotized in known fashion. The diazonium compound formed is added to 200 cc. of a cold, dilute acetic acid solution containing 23.3 grams of 2-N-β-hydroxyethyl-(2-methoxy-5-methyl) anilinobutadiene-1,3. The coupling reaction and recovery of the precipitate formed are accomplished in accordance with the procedure described in Example 16. The resulting azo dye compound colors wool, silk, and nylon textile materials rubine shades from an aqueous solution of the dye which may contain salt. Polymerization on the fabric may be effected by treating the dyed and washed fabric in the manner hereinafter described. The dye has the formula:

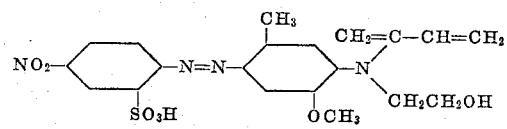

*Example 18*

23.0 grams of 2-amino-5-nitrobenzene methylsulfonamide are diazotized in the usual manner and the solution of diazonium compound formed is added to 200 cc. of a cold dilute acetic acid solution containing 23.3 grams of 2-N-β-ethoxyethyl-m-hydroxy-anilinobutadiene-1,3. The coupling reaction and recovery therefrom of the precipitated azo dye compound are accomplished in accordance with the procedure described in Example 1. The resulting dye colors cellulose acetate rubine shades and may be polymerized on the fabric in the manner hereinafter described. It has the formula:

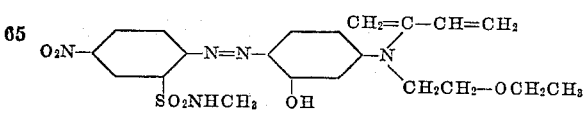

*Example 19*

24.4 grams of 2-amino-5-nitrobenzene ethylsulfonamide are added to 200 cc. of water containing 30 cc. of 36% hydrochloric acid. The resulting solution is cooled to 0–5° C. and diazotized by adding 6.9 grams of sodium nitrite dissolved in water.

23.3 grams of 2-N-β-hydroxypropyl-m-toluidino-butadiene-1,3 are dissolved in 200 cc. of dilute hydrochloric acid. Coupling is accomplished by adding the diazo solution prepared above, cooling the resulting mixture to 0–10° C., and then adding a solution of sodium carbonate slowly with stirring until the reaction is neutral to litmus. The precipitate is recovered by filtration, washed with water, and dried. The azo dye compound obtained has the formula:

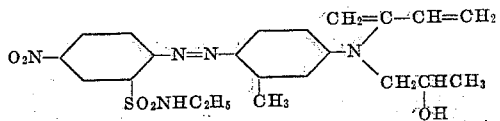

and colors cellulose acetate rubine shades. The dye may be polymerized on the fabric by following the procedure hereinafter disclosed.

It will be understood that the foregoing examples are intended to be illustrative and not limitative of our invention. As will be apparent to those skilled in the art, any of the diazonium components disclosed herein can be coupled with any of the coupling components disclosed herein to yield other azo dye compounds of the invention.

In order that the invention may be more fully understood the method used in preparing any of the various coupling components of my invention is given hereinafter.

The process of preparing 2-anilinobutadiene-1,3 compounds is disclosed in U. S. Patent No. 2,301,971, issued November 17, 1942, to Reppe, Hecht, and Gassenmeier. It comprises exposing a N-substituted 2-aminobutine-3 compound in the gas phase to elevated temperatures. Catalysts such as aluminum hydroxide which has been precipitated in the presence of 1% of iron oxide are recommended for accelerating the isomerization.

The preparation of N-substituted 2-aminobutine-3 compounds is disclosed by the above inventors in U. S. Patent No. 2,342,493, issued February 22, 1944. It comprises treating an arylamine such as aniline or a substituted derivative thereof with acetylene in the presence of a metallic acetylide. By starting with an appropriately substituted primary or secondary monocyclic arylamine of the benzene series and treating it in accordance with this process and then in accordance with the process of the preceding paragraph any of the coupling components of my invention may be prepared.

The application of the azo dye compounds of my invention to the coloration of textile materials is best accomplished by immersing the material in a warm aqueous suspension of the dye. The details of the dyeing process are discussed hereinafter.

Because of the relative insolubility in water of most of the subject compounds, it is advantageous to grind the dye to a fine paste in the presence of a suitable dispersing agent such as a sulfonated oil or soap and then disperse the paste in water. The amount of dye employed will, of course, depend on the intensity of coloration desired. Generally speaking, 1–3% by weight of dye to material is used although any desired proportion can be selected. Depending on the solubility of the dye, the dispersing agent may sometimes be omitted. Suitable dispersing agents together with the amounts preferably used are disclosed in McNally and Dickey Patent No. 2,115,030, issued April 26, 1938. The process disclosed therein for the dyeing of cellulose acetate may be applied to this material using the nuclear non-sulfonated dyes of the present invention.

Direct dyeing operations can, with advantage, be conducted at temperatures of about 70–85° C., but any suitable temperatures may be used. Thus the textile material to be dyed or colored is ordinarily added to the dyebath at a temperature lower than that at which the main portion of the dyeing is to be effected, a temperature approximating 45–55° C., for example, following which the temperature is raised to that selected for carrying out the dyeing operation. The temperature at which the dyeing is conducted may, of course, be varied somewhat depending on the particular material undergoing coloration.

In order to inhibit polymerization of the dyestuff prior to its fixation on the fiber a small amount of a suitable antioxidant such as hydroquinone or copper acetate may be added to the dye bath. Amounts of anti-oxidant on the order of .01–1% based on the weight of dye compound are ordinarily added.

When the fabric has attained its desired shade it is removed from the dye bath, washed with soap, rinsed, and dried. In this operation anti-oxidants are removed leaving the dye on the fiber uninhibited for polymerization.

Polymerization is carried out in any convenient manner. Ordinarily exposure to air, sunlight, ultra-violet light, heat, or to some combination thereof effects a slow polymerization. If desired, the process can be accelerated by the action of any of the peroxide compounds normally employed in the polymerization of ethylenic compounds. Suitable for this purpose are hydrogen peroxide, benzoyl peroxide, acetyl peroxide, tertiary-butyl hydroperoxide, and peracetic acid. Amounts on the order of .001–1% based on the weight of dye used are customarily employed depending on the rate of polymerization desired. The peroxide is added to a water bath, and the dyed textile material is immersed therein for a period of 5–25 minutes following which it is removed, washed with water, and dried. By a procedure such as the above, the dye is polymerized on the fabric and made extremely fast to washing.

I claim:

1. The monoazo dye compounds having the general formula:

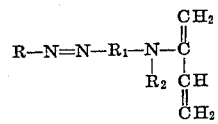

wherein R and $R_1$ each represent a monocyclic benzene nucleus and $R_2$ represents a member selected from the group consisting of a hydrogen atom, an alkyl group having from one to four, inclusive, carbon atoms, a hydroxyalkyl group having from two to three, inclusive, carbon atoms, and an alkoxyalkyl group having from three to four, inclusive, carbon atoms.

2. The monoazo dye compounds having the general formula:

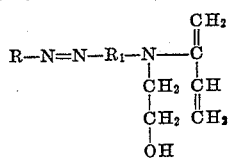

wherein R and $R_1$ each represent a monocyclic benzene nucleus.

3. The monazo dye compounds having the general formula:

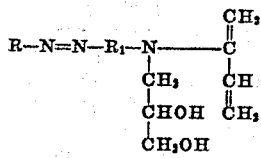

wherein R and R₁ each represent a monocyclic benzene nucleus.

4. The azo dye compound having the formula:

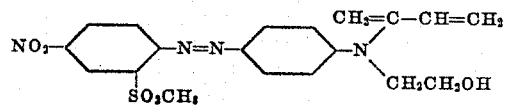

5. The azo dye compound having the formula:

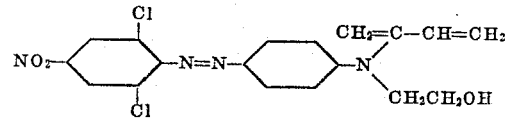

JOSEPH B. DICKEY.

REFERENCES CITED

The following references are of record in the file of this patent:

UNITED STATES PATENTS

| Number | Name | Date |
|---|---|---|
| 1,690,481 | Ellis | Nov. 6, 1928 |
| 2,123,740 | Murphy | July 12, 1938 |
| 2,373,407 | McNally | Apr. 10, 1945 |
| 2,432,393 | Dickey | Dec. 9, 1947 |